United States Patent
Moore et al.

(10) Patent No.: US 9,507,466 B2
(45) Date of Patent: Nov. 29, 2016

(54) INTRUSION DETECTION USING A CAPACITANCE SENSITIVE TOUCHPAD

(75) Inventors: J. Douglas Moore, Salt Lake City, UT (US); Jared G. Bytheway, Sandy, UT (US); Dale J. Carter, Orem, UT (US); David Taylor, West Jordan, UT (US)

(73) Assignee: CIRQUE CORPORATION, Salt Lake City, UT (US)

( * ) Notice: Subject to any disclaimer, the term of this patent is extended or adjusted under 35 U.S.C. 154(b) by 867 days.

(21) Appl. No.: 12/117,565

(22) Filed: May 8, 2008

(65) Prior Publication Data

US 2008/0278355 A1    Nov. 13, 2008

Related U.S. Application Data

(60) Provisional application No. 60/916,624, filed on May 8, 2007, provisional application No. 60/939,797, filed on May 23, 2007, provisional application No. 60/986,060, filed on Nov. 7, 2007.

(51) Int. Cl.
  *G06F 3/044* (2006.01)
  *G06F 21/55* (2013.01)
  *G06F 21/83* (2013.01)

(52) U.S. Cl.
  CPC .............. *G06F 3/044* (2013.01); *G06F 21/83* (2013.01); *H03K 2217/96058* (2013.01)

(58) Field of Classification Search
  CPC ....................................... G06F 3/044
  USPC ............................ 702/47, 85, 104, 107, 196
  See application file for complete search history.

(56) References Cited

U.S. PATENT DOCUMENTS

| | | | | |
|---|---|---|---|---|
| 4,186,392 A | * | 1/1980 | Holz | 345/174 |
| 4,953,971 A | * | 9/1990 | Highfill | 353/122 |
| 4,991,146 A | * | 2/1991 | Ransdell et al. | 367/98 |
| 5,283,559 A | * | 2/1994 | Kalendra et al. | 345/168 |
| 5,305,017 A | * | 4/1994 | Gerpheide | 345/174 |
| 5,345,807 A | * | 9/1994 | Butts et al. | 73/1.15 |
| 6,092,410 A | | 7/2000 | Kaehler et al. | |
| 6,097,606 A | * | 8/2000 | Groves et al. | 361/747 |
| 6,222,528 B1 | * | 4/2001 | Gerpheide et al. | 345/173 |
| 6,715,078 B1 | * | 3/2004 | Chasko et al. | 713/193 |
| 8,123,133 B2 | * | 2/2012 | Dubois et al. | 235/486 |
| 2002/0002683 A1 | * | 1/2002 | Benson et al. | 713/194 |
| 2004/0178995 A1 | * | 9/2004 | Sterling | 345/173 |
| 2004/0239535 A1 | | 12/2004 | Chadwell et al. | |
| 2005/0035955 A1 | | 2/2005 | Carter et al. | |
| 2007/0070047 A1 | | 3/2007 | Jeon et al. | |

FOREIGN PATENT DOCUMENTS

WO    WO 2004/068521    8/2004

* cited by examiner

*Primary Examiner* — Regis Betsch
(74) *Attorney, Agent, or Firm* — Morriss O'Bryant Compagni, PC

(57) ABSTRACT

A capacitance sensitive proximity and touch-sensitive detection device having an XY electrode grid sensor, wherein a compensation matrix is created when the capacitance sensitive touchpad is installed within a PIN Entry Device (PED), wherein the compensation matrix enables the capacitance sensitive touchpad to compensate and be balanced for the operating environment of the PED, and wherein physical keys of a keypad can be also be individually identified as an actuated key by using a unique "key profile" for each key, and wherein the insertion of a foreign conductive and/or dielectric material such as an intruding sensor in proximity of the XY electrode grid sensor of the touchpad will cause an imbalance in the electrodes on the capacitance sensitive proximity and touch-sensitive detection device, thereby alerting detection circuitry that tampering has occurred with the PED.

21 Claims, 4 Drawing Sheets

United States Patent US 9,507,466 B2

INTRUSION DETECTION USING A CAPACITANCE SENSITIVE TOUCHPAD

CROSS REFERENCE TO RELATED APPLICATIONS

This document claims priority to and incorporates by reference all of the subject matter included in the provisional patent application docket number 3983.CIRQ.PR, having Ser. No. 60/916,624 and filed on May 8, 2007, and provisional patent application docket number 3983.CIRQ.PR2, having Ser. No. 60/939,797 and filed on May 23, 2007, and provisional patent application docket number 3983.CIRQ.PR3, having Ser. No. 60/986,060 and filed on Nov. 7, 2007.

BACKGROUND OF THE INVENTION

Field of the Invention

This invention relates generally to capacitance sensitive touchpads. More specifically, the present invention relates to the ability to configure a touchpad or touchpad detection circuitry such that insertion of any foreign conductive or dielectric material in a touch or proximity sensitive sensor area of the capacitance sensitive touchpad sensors will be detectable, wherein the foreign conductive or dielectric material is any object intended to intercept signals or detect objects that are generating signals, such as the capacitance sensitive touchpad, other circuits and switches.

Description of Related Art

There are several designs for capacitance sensitive touchpads. One of the existing touchpad designs that can be modified to work with the present invention is a touchpad made by CIRQUE® Corporation. Accordingly, it is useful to examine the underlying technology to better understand how any capacitance sensitive touchpad can be modified to work with the present invention.

The CIRQUE® Corporation touchpad is a mutual capacitance-sensing device and an example is illustrated as a block diagram in FIG. 1. In this touchpad 10, a grid of X (12) and Y (14) electrodes and a sense electrode 16 is used to define the touch-sensitive area 18 of the touchpad. Typically, the touchpad 10 is a rectangular grid of approximately 16 by 12 electrodes, or 8 by 6 electrodes when there are space constraints. Interlaced with these X (12) and Y (14) (or row and column) electrodes is a single sense electrode 16. All position measurements are made through the sense electrode 16.

The CIRQUE® Corporation touchpad 10 measures an imbalance in electrical charge on the sense line 16. When no pointing object is on or in proximity to the touchpad 10, the touchpad circuitry 20 is in a balanced state, and there is no charge imbalance on the sense line 16. When a pointing object creates imbalance because of capacitive coupling when the object approaches or touches a touch surface (the sensing area 18 of the touchpad 10), a change in capacitance occurs on the electrodes 12, 14. What is measured is the change in capacitance, but not the absolute capacitance value on the electrodes 12, 14. The touchpad 10 determines the change in capacitance by measuring the amount of charge that must be injected onto the sense line 16 to reestablish or regain balance of charge on the sense line.

The system above is utilized to determine the position of a finger on or in proximity to a touchpad 10 as follows. This example describes row electrodes 12, and is repeated in the same manner for the column electrodes 14. The values obtained from the row and column electrode measurements determine an intersection which is the centroid of the pointing object on or in proximity to the touchpad 10.

In the first step, a first set of row electrodes 12 are driven with a first signal from P, N generator 22, and a different but adjacent second set of row electrodes are driven with a second signal from the P, N generator. The touchpad circuitry 20 obtains a value from the sense line 16 using a mutual capacitance measuring device 26 that indicates which row electrode is closest to the pointing object. However, the touchpad circuitry 20 under the control of some microcontroller 28 cannot yet determine on which side of the row electrode the pointing object is located, nor can the touchpad circuitry 20 determine just how far the pointing object is located away from the electrode. Thus, the system shifts by one electrode the group of electrodes 12 to be driven. In other words, the electrode on one side of the group is added, while the electrode on the opposite side of the group is no longer driven. The new group is then driven by the P, N generator 22 and a second measurement of the sense line 16 is taken.

From these two measurements, it is possible to determine on which side of the row electrode the pointing object is located, and how far away. Pointing object position determination is then performed by using an equation that compares the magnitude of the two signals measured.

The sensitivity or resolution of the CIRQUE® Corporation touchpad is much higher than the 16 by 12 grid of row and column electrodes implies. The resolution is typically on the order of 960 counts per inch, or greater. The exact resolution is determined by the sensitivity of the components, the spacing between the electrodes 12, 14 on the same rows and columns, and other factors that are not material to the present invention.

The process above is repeated for the Y or column electrodes 14 using a P, N generator 24

Although the CIRQUE® touchpad described above uses a grid of X and Y electrodes 12, 14 and a separate and single sense electrode 16, the sense electrode can actually be the X or Y electrodes 12, 14 by using multiplexing. Either design will enable the present invention to function.

With this understanding of one capacitance sensitive touchpad, it is now possible to discuss the present invention and a particular application because of shortcomings in state of the art designs.

A problem that has arisen in point-of-sale (POS) devices is that they are vulnerable to tampering. The stealing of credit card information is on the rise and is a substantial cause of concern among consumers. Accordingly, there is a substantial benefit from making devices more secure that read confidential data from credit and debit cards that can be used to access accounts.

For example, there are many electronic devices that are used to read data stored on credit or debit cards. Most of these devices read information from a magnetic strip. However, other electronic devices read information from newer smart cards using radio frequency signals. Both of these types of electronic devices then enable a user to input a secret Personal Identification Number (PIN) in order to complete a transaction. The PIN is typically entered on a PIN Entry Device (PED). Vulnerabilities in the design of PEDs show that these vulnerabilities can be exploited using unsophisticated techniques to expose PINs, credit and debit card numbers and other cardholder data.

One method of obtaining PIN information is to detect PIN data as it is being entered from a keypad on the PED. Accordingly, it would be an advantage over the state of the art to provide a PED that would be able to detect the presence of a foreign object, such as a sensor designed to detect input without interfering with the process of providing input to the PED, wherein the input is typically confidential information. It would also be an advantage over the prior art to adapt the new means of detection of an intruding sensor to any device that can be tampered with in order to insert a sensor or other device that can monitor activity on the device.

BRIEF SUMMARY OF THE INVENTION

In a first embodiment, the present invention is a capacitance sensitive proximity and touch-sensitive detection device having an XY electrode grid sensor, wherein a compensation matrix is created when the capacitance sensitive touchpad is installed within a PIN Entry Device (PED), wherein the compensation matrix enables the capacitance sensitive touchpad to compensate and be balanced for the operating environment of the PED, and wherein physical keys of a keypad can be also be individually identified as an actuated key by using a unique "key profile" for each key, and wherein the insertion of a foreign conductive and/or dielectric material such as an intruding sensor in proximity of the XY electrode grid sensor of the touchpad will cause an imbalance in the electrodes on the capacitance sensitive proximity and touch-sensitive detection device, thereby alerting detection circuitry that tampering has occurred with the PED.

In a first aspect of the invention, the present invention is not limited to a PED, but can be inserted into any device where tampering detection is needed.

In a second aspect of the invention, an alternative embodiment is to use a single X or Y electrode and a SENSE electrode disposed near the keys of a keypad in order to create the capacitance sensitive proximity and touch-sensitive detection device.

In a third aspect of the invention, another alternative embodiment is to use Indium-Tin Oxide (ITO) as breakable electrodes coupled to the touchpad, wherein tampering will break the ITO electrodes and enable detection of tampering.

In a fourth aspect of the invention, another alternative embodiment is to use a perforated substrate on which touchpad electrodes are disposed, wherein tampering will cause the substrate to tear along perforations and thereby enable detection of tampering.

In a fifth aspect of the invention, another alternative embodiment is to use ITO electrodes as part of an Interlock circuit that shuts down the PED if tampering is detected.

In a sixth aspect of the invention, another alternative embodiment is to dispose a first electrode in the interior of the PED, and a second electrode on the exterior of the PED.

In a seventh aspect of the invention, each key can be individually identified through the use of a key profile that identifies each actuated key.

In an eighth aspect of the invention, the gain or sensitivity of the capacitance sensitive touch and proximity detection device can be modified, to thereby reduce the occurrence of false positive tampering signals.

In a ninth aspect of the invention, the system can execute two separate detection systems simultaneously, one for tampering with or intruding into the PED, and one for tampering with or intruding into operation of the keys.

These and other objects, features, advantages and alternative aspects of the present invention will become apparent to those skilled in the art from a consideration of the following detailed description taken in combination with the accompanying drawings.

BRIEF DESCRIPTION OF THE SEVERAL VIEWS OF THE DRAWINGS

FIG. 6 is a perspective view of a substrate having a perforation that will tear, breaking an ITO electrode if the substrate were to be tampered with.

DETAILED DESCRIPTION OF THE INVENTION

Reference will now be made to the drawings in which the various elements of the present invention will be given numerical designations and in which the invention will be discussed so as to enable one skilled in the art to make and use the invention. It is to be understood that the following description is only exemplary of the principles of the present invention, and should not be viewed as narrowing the claims which follow.

While many embodiments of the present invention utilize a general purpose touchpad, other capacitance sensing devices that are not touchpads can be used to achieve the same results, and should be considered to be within the scope of the present invention. But when a touchpad is used to implement the present invention, the touchpad can be dedicated to providing detection of an intruding sensor, or to operate to provide intrusion detection and touchpad functionality. Accordingly, use of the term touchpad should not be construed as limiting the present invention.

The present invention is focused on adapting a general purpose touchpad to provide two types of tampering or intrusion detection. The first type of intrusion detection uses the electrodes of a touchpad to perform general tampering detection. This first type of tampering detection is always enabled, and does not require operation of the device for detection to occur.

The second type of tampering detection also uses a touchpad, but is focused exclusively on touch or proximity sensing of keys that are used as part of a keypad to enter data, such as a PIN. This second type of tampering detection only operates when a key is actually pressed. Both the first and second types of tampering detection use a compensation matrix, as will be explained.

The first embodiment of the invention is a capacitance sensitive touchpad, such as a touchpad manufactured by CIRQUE® Corporation. As explained above, the CIRQUE® capacitance sensitive touchpad provides an XY electrode sensor grid. Such a touchpad is capable of detecting the presence of a pointing object, such as a finger, stylus or button in contact with or in proximity of a touchpad sensing surface. The distance at which proximity sensing can detect and track a pointing object depends upon the specific touchpad hardware being used. However, what is important is that detection and tracking are both possible without physical contact.

Figure 1:
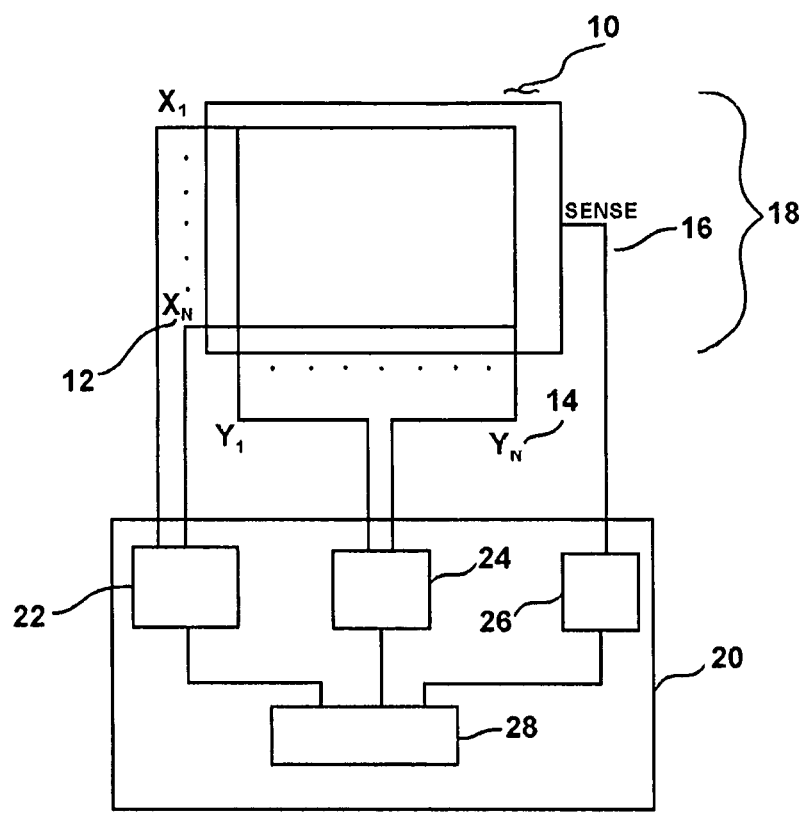
FIG. 1 is a schematic diagram of the prior art capacitance sensitive touchpad provided by CIRQUE® Corporation.
Figure 2:
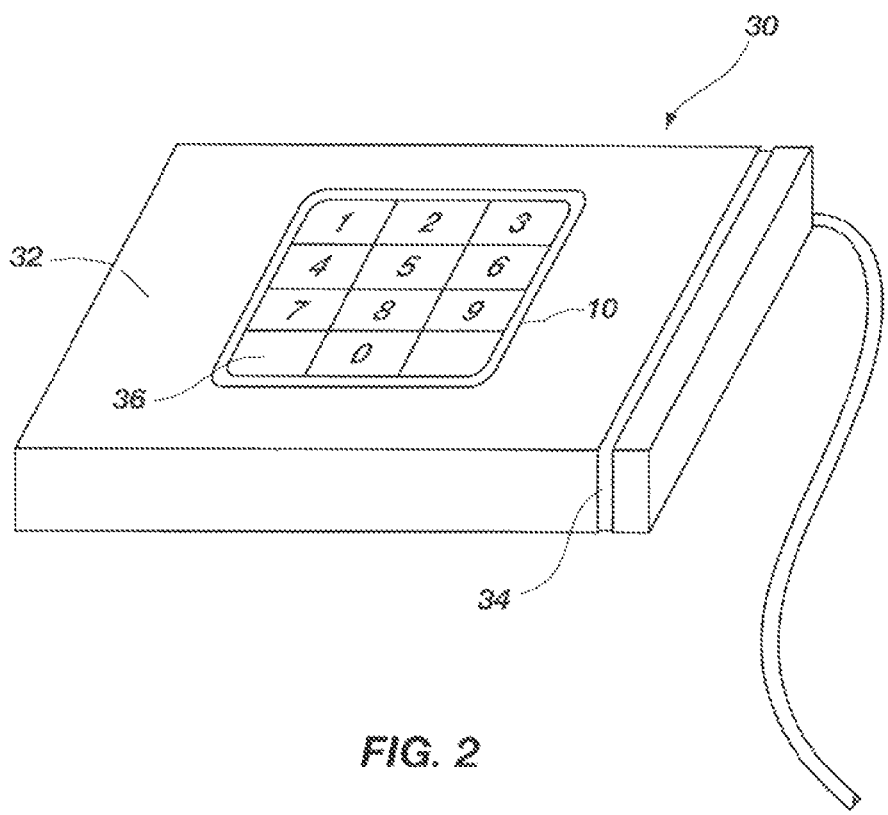
FIG. 2 is a perspective view of a PED with a magnetic card swipe slot and a keypad disposed over a touchpad.

FIG. 2 is a perspective view of a PED 30 as envisioned in the present invention. It should be remembered that the PED 30 can be any device that can be tampered with. In this embodiment, the PED 30 has its own housing unit 32. This particular PED 30 includes a slot 34 having a magnetic strip reader disposed therein. A keypad 36 is provided for entering PIN data. The individual keys of the keypad 36 can be constructed using any type of key mechanism. What is important is that the keypad 36 is disposed over a touchpad 10 that is disposed under the keypad. The touchpad 10 can be disposed on the outside of the housing unit 32 or inside it because of proximity sensing capabilities.

The PED 30 can be altered to include other features or different features. For example, the PED 30 can include a touchpad for recording a signature, or a touchpad having virtual buttons that replace the mechanical keypad 36. Alternatively, the PED 30 can be any other device that requires a means for determining if the device has been tampered with.

The present invention uses the concept of a compensation matrix to provide intrusion detection (also referred to as "tampering" or "tampering detection"). A compensation matrix is a tool used by a touchpad for calibration. Calibration enables a touchpad to compensate for the internal variances such as manufacturing variances of the XY electrode grids and external variances such as a housing or enclosure in which the touchpad is disposed for operation. Calibration is the process wherein these variances such as imbalances in electrical charges on electrodes are "zeroed" out by the creation of a compensation matrix so that they can be ignored, as is understood by those skilled in the art of touchpads. By storing the measured imbalances in the compensation matrix, these imbalances can be eliminated when the touchpad is being used.

The compensation matrix may be created just once at the time of manufacture if it is anticipated that the operating environment of the touchpad is unlikely to change. Alternatively, the compensation matrix might be recreated on the fly each time that the touchpad is activated. What is important in the present invention is that the compensation matrix can be stored. Storing the compensation matrix makes it possible for the touchpad to compare its current operating environment to the operating environment that existed when the stored compensation matrix was created. This comparison enables the present invention to determine if a change has occurred in the operating environment. A change in the operating environment is going to be interpreted as detection of intrusion or tampering.

Accordingly, when the touchpad 10 is disposed within a PED 30, the compensation matrix is typically calibrated one time only. However, the present invention should not be considered to be limited to a single calibration operation, especially if there may be a valid reason for the operating to change, such as the opening of the housing unit 32 by a qualified technician. Thus it is an aspect of the present invention to provide for recalibration and thus recreation of the compensation matrix when necessary.

This calibration procedure is sufficient to enable the touchpad to operate in whatever environment that the PED 30 is being used. Typically, no further calibration is needed to create the stored compensation matrix, and the PED can be operated in almost any environment without affecting the calibration of the detection system. But it is this ability to recalibrate or create a new compensation matrix for comparison to a stored compensation matrix that enables the present invention to provide detection of an intruding sensor within the environment of the PED 30.

The compensation matrix can be created by making a plurality of measurements of the XY electrode grid when the touchpad 10 is not being used. In other words, no conductive or dielectric materials should be placed within the sensing range of the touchpad 10 except for the physical environment in which the touchpad is going to operate. The next step is to transmit a series of signals (signal patterns) to various electrodes of the touchpad 10. Measurements are then taken of the response of the touchpad 10 to the signal patterns. These signal patterns and the corresponding response of the touchpad 10 are then stored in the compensation matrix.

To make a comparison of the stored compensation matrix and a new compensation matrix, the touchpad should perform an intrusion detection procedure. The first step is to have the same signal patterns transmitted to the touchpad 10 and compared to the original touchpad responses that are in the stored compensation matrix. The compensation matrix is typically but not necessarily stored in non-volatile memory of the touchpad circuitry. The new compensation matrix that is created to compare to the stored compensation matrix does not need to be in non-volatile memory as it is a temporary matrix used for comparison purposes only. However, it may be desirable to store the temporary compensation matrix so that the conditions that caused a positive intrusion detection situation can be verified or studied.

The intrusion detection using the compensation matrix for the touchpad 10 operates at all times. In other words, the intrusion detection is always on if the touchpad 10 is turned on. However, even if the PED 30 or other device is turned off when an intruding sensor is being installed, as is likely the case, the touchpad 10 should always perform the intrusion detection procedure immediately after being started so that it can determine if there has been any tampering before accepting any information that might be compromised.

The first type of intrusion detection described above is a versatile intrusion detection system that can be modified extensively because of the nature of the touchpad 10. In other words, electrodes from the touchpad 10 can be disposed in ways other than or in addition to the typical planar XY orthogonal electrode grid as discussed previously. While the first embodiment of the present invention uses a typical touchpad 10, alternative electrode arrangements can be used. For example, the X and Y electrodes may be arranged so that the electrodes are disposed as shown in FIG. 3.

Figure 3:
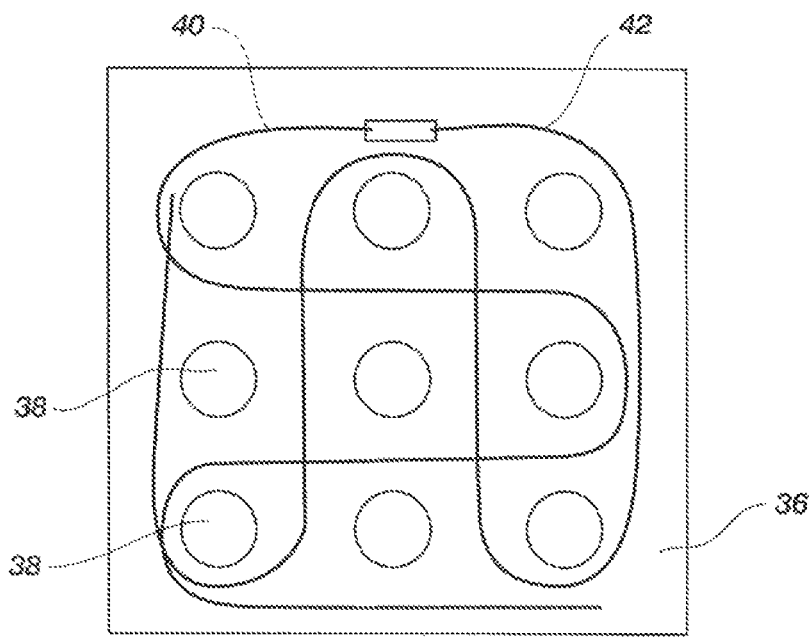
FIG. 3 is a top view of a keypad with an X and SENSE electrode disposed throughout the keypad.

In FIG. 3, the keypad 36 is shown with 9 mechanical keys 38. This example of 9 keys 38 is for illustration purposes only, and should not be considered a limiting factor. More or fewer keys 38 can be used.

In this first alternative embodiment, it is not necessary to implement a complete or typical XY touchpad 10 as explained above. A capacitance sensing circuit can be provided that is not used for input, but is instead dedicated to intrusion detection. In a touchpad or in a dedicated intrusion detection system, at least two electrodes that are coupled to touchpad circuitry can be used to detect tampering with a PED 30.

As shown in FIG. 3, a single X electrode 40 and a SENSE electrode 42 can be placed near the keys 38 of the PED 30 by running each electrode 40, 42 around the keys in a suitable pattern. The pattern should be sufficient to detect an intruding sensor capable of detecting signals.

For example, as shown in FIG. 3, the X electrode 40 is shown running between the keys 38 of the keypad 36. An insulating material is then disposed over the X electrode 40. Then the SENSE electrode 42 is also run between the keys 38 of the keypad 36 and over the X electrode 40, while remaining electrically separate therefrom.

The next step is to place a template or other outer covering over the X and SENSE electrodes 40, 42 so that they would not be visible. Alternatively, the X and SENSE electrodes could be disposed underneath the keypad surface shown, in other words on the interior of the PED 30 so that they would now be inside the PED and not visible to someone looking underneath the keys 38.

The intertwining pattern shown in FIG. 3 of the X and SENSE electrodes 40, 42 is used for illustration purposes only. The exact pattern used and the spacing of the electrodes 40, 42 can be modified as needed, and should not be considered to be a limiting factor of the invention. In addition, it should be mentioned that the X electrode can be substituted by the Y electrode, and its selection was also arbitrary, and the X, Y and SENSE electrodes can function interchangeably in the present invention.

This first alternative embodiment is a simple and yet effective way to detect the presence of an intruding sensor being disposed on or near the keys 38 of a PED 30. Just as a complete touchpad is calibrated, the single X electrode and SENSE electrode can also be calibrated and a compensation matrix is created, even if it is relatively simple in comparison to a compensation matrix required for the greater number of X and Y electrodes of a complete touchpad 10.

The introduction of an intruding sensor is again detected by comparing the response of the X and SENSE electrodes 40, 42 to a signal transmitted on the electrodes, and then making a comparison between the new compensation matrix and the stored compensation matrix to find any change. However, it should be realized that in this case, the X and SENSE electrodes are not part of the operation of the PED 30. The X and SENSE electrodes 40, 42 are dedicated to the function of intruding sensor detection.

Figure 4:
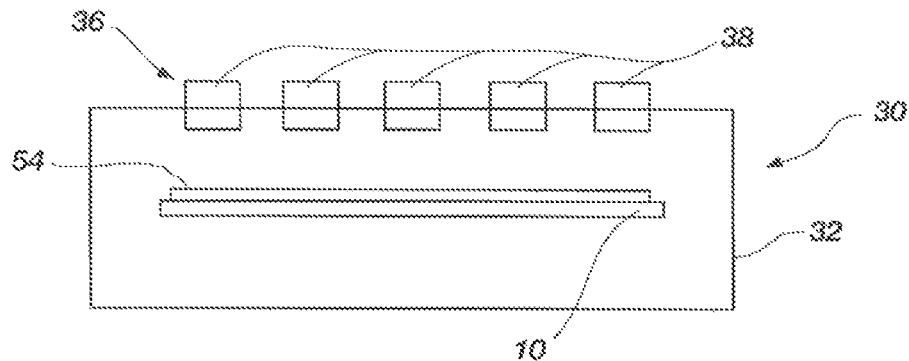
FIG. 4 is a cut-away profile view of a PED showing the capacitance sensitive touchpad, a keypad and an intruding sensor.

FIG. 4 is provided as a profile cut-away view of a PED 30 having a housing 32. It is known that one method of compromising the security of a PED 30 is to open the housing 32 and insert an intruding sensor 54 that will detect the information that is input to the PED during normal PED operation. The most obvious location for inserting an intruding sensor 54 is between the keys 38 of a keypad 36, and the touchpad 10 with which the keys are making contact as shown in FIG. 4. The intruding sensor 54 can be detected by the capacitance sensitive touchpad 10 by the effect that the intruding sensor 54 will have on the touchpad 10 and thus the compensation matrix.

An intruding sensor 54, as used herein, is defined as any sensor or portion thereof that is being placed on or inside at least a portion of the PED 30 in order to detect data that is being input to the PED. Accordingly, an intruding sensor 54 may be nothing but a simple electrode, a fiber optic cable, or any other sensor that can perform data input detection as is known to those skilled in the art of sensors. It is noted that the data does not even need to be transported away from the intruding sensor 54, but can instead be recorded for future retrieval.

The intruding sensor 54 will affect the electrical balance of the touchpad 10 because it is a conductive and/or a dielectric material. The imbalance caused by the conductive and/or dielectric material will not have been compensated for by the stored compensation matrix because the calibration that was performed was for the original operating environment without the intruding sensor 54 being present. Accordingly, it is only necessary to perform the intrusion detection procedure and compare the new compensation matrix to the stored compensation matrix to determine if the operating environment of the touchpad 10 has been altered.

Even though the intruding sensor 54 can be detected because of the changes that will occur in the electrical balance of the electrodes in the touchpad 10, that does not necessarily mean that the PED 30 would stop functioning. If the PED 30 were no longer to function, it would be an obvious signal to the person who is tampering that the intruding sensor 54 interferes with normal operation, and the attempt at stealing data would be abandoned. Thus, it is possible for the PED 30 to function normally even though there is an imbalance in the detection system. For example, the PED 30 could send an alert that the PED has been tampered with, then recalibrate for the presence of the intruding sensor 54 and continue operating.

However, the touchpad 10 of the present invention may not have to perform any recalibration in order to continue functioning. The touchpad of the present invention is often able to continue operation even in the presence of the imbalance on electrodes of the touchpad 10. Thus, in this first embodiment, it would be a routine function of a PED 30 to perform a comparison with values stored in the compensation matrix to determine if the initial operating environment for which the touchpad 52 was calibrated has been materially altered. Performing the intrusion detection procedure should be performed at start up of the touchpad, but should also be performed periodically when the touchpad has been in on for a predetermined period of time, in case an intruding sensor 54 is disposed within the operating environment of the touchpad 10 without the touchpad being turned off.

Another aspect of this first embodiment of the present invention is the distance from the surface of the touchpad 10 that the intruding sensor 54 is detectable. The keys 38 of the PED 30 are going to be separated from the touchpad 10 by some distance. This distance is likely to be relatively small. The present invention is capable of detecting the intruding sensor 54 even if it is not placed directly on the surface of the touchpad 10. The intruding sensor 54 can be detected at least up to and possibly beyond 1 cm above the surface of the touchpad 10.

In an alternative embodiment of the invention, it is envisioned that the electrodes of the touchpad might be installed in such a way so that moving of the electrodes is detectable. The use of Indium-tin-oxide (ITO) as electrodes of touchpads is well known to those skilled in the art of CIRQUE® Corporation touchpads. However, other materials can also be used in place of ITO that will also provide the same functionality in these embodiments, and so the present invention should not be considered limited to ITO.

Figure 5:
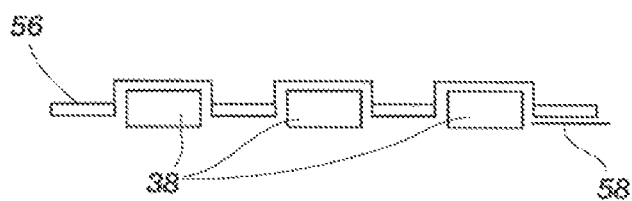
FIG. 5 is a cut-away profile view of a keypad, a cover template and at least one ITO electrode that will break if the cover template is removed from the keypad.

In FIG. 5 various layers of a PED 30 are shown that can be used with ITO electrodes, because a useful property of ITO is that it is brittle. When a PED 30 is being tampered with, a person attempting to insert an intruding sensor 54 into a PED may be forced to pry off a cover template 56 disposed over the keys 38 to seal them so that an intruding sensor 54 cannot be put underneath them. The intruding sensor 54 is disposed under the cover template 56, and then the cover template is put back in place. The cover template 56 can be sealed against the housing 32 or against the keypad 36. ITO electrodes 58 can be placed between the cover template 56 and the housing 32 or the keypad 36. Some sort of adhesive is going to be used to secure the cover template 56 into place.

When the cover template 56 is pried off to insert the intruding sensor 54, the ITO electrodes 58 are going to be damaged. Even if the cover template 56 is returned to the exact same location so that no tampering is visible, the ITO electrodes 58 have already been materially altered, and the intrusion detection procedure will reveal the tampering. This is because the adhesive holding the cover template 56 in place will be damaged. If ITO electrodes 58 are attached to the adhesive, they will be ripped apart. The ITO electrodes 58 may remain intact on the PED 30 and on the adhesive attached to the underside of the cover template 56, but yet they will also be broken.

Even if the cover template 56 were to be reattached without the insertion of an intruding sensor 54, and even if all the broken ITO electrodes 58 were again making electrical contact with each other, the original calibration would be ruined, and the ITO electrodes will now give a detectably different response to signal patterns when compared to the signals in the stored compensation matrix. Thus, even if the PED 30 continues to function, evidence of the tampering will be apparent to the present invention.

Advantageously, these ITO electrodes 58 or electrodes of any other comparable capacitance sensing system might be disposed on or over any surfaces that a person might try to cut through, pry up or otherwise gain access through in order to insert an intruding sensor 54 into the PED 30. Accordingly, this invention should not be considered to be limited only to the example given, but should be read to cover any surfaces of any device.

Another alternative embodiment of the present invention is the use of a breakable substrate. Along with a breakable substrate, it would also be necessary to provide a breakable insulating material that is disposed between layers of electrodes of either a complete touchpad 10, or the two or more electrodes being used in an alternative embodiment. Thus, a relatively delicate material can be used for electrodes such as ITO, the material used for the substrate, and for the material that is used to insulate layers of electrodes from each other.

Figure 6:
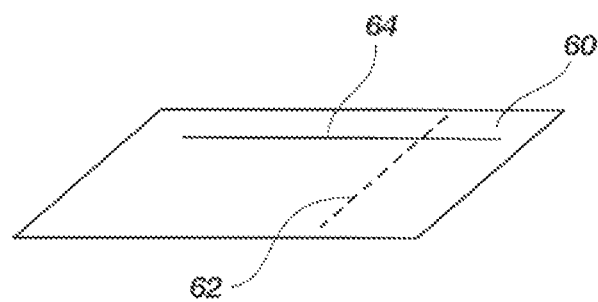
Figure 7:
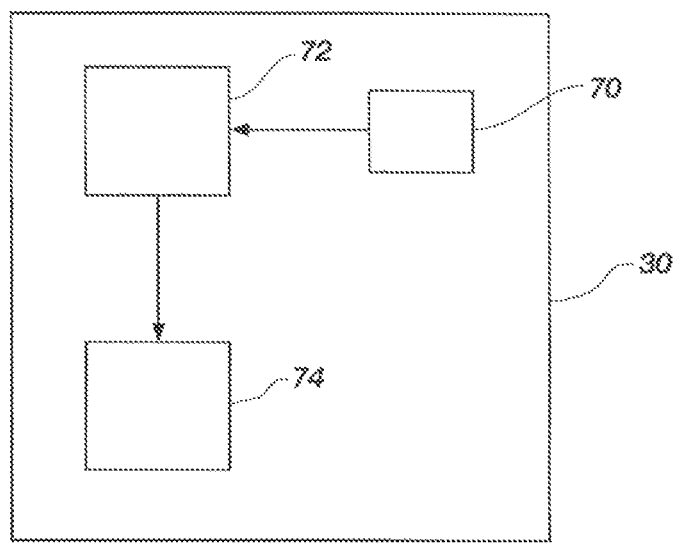
FIG. 7 is a block diagram of a PED processor that is deactivated by an Interlock circuit if tampering is detected.

For example as shown in FIG. 6, a substrate 60 can be provided having perforations 62 that will cause the substrate to tear along the perforation if someone attempts to pry open a cover template or a housing in order to access a normally hidden surface. Adhesive can be used to join a portion of the substrate 60 to a PED 30, and a different and break-away portion of the substrate 60 to an underside of the cover template. Thus, removal of the cover template will cause the substrate 60 to break or tear along the perforation 62, and thereby break at least one electrode 64 that is disposed on the substrate and across the perforation. Again, a comparison of a stored compensation matrix with a new compensation matrix created using the intrusion detection procedure will be different, and a sign that tampering may have occurred.

Figure 8:
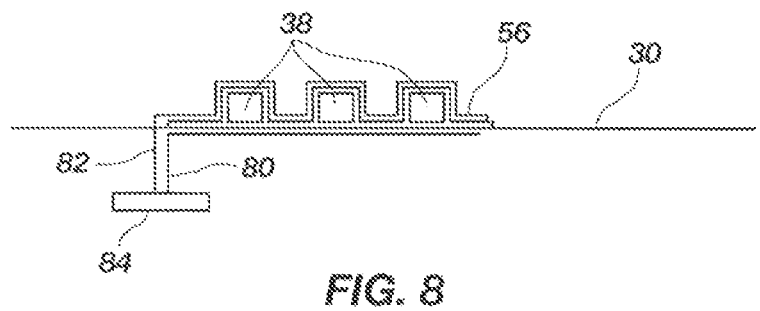
FIG. 8 is a cut-away profile view of electrodes coupled to touchpad circuitry for use in detecting an intruding sensor.

FIG. 8 is a block diagram showing another alternative embodiment of the present invention and its relationship to an Interlock circuit 72 of a PED 30. If certain types of tampering are detected by the intrusion detection system 70 of the present invention, the Interlock circuit 72 is designed to make the processing unit 74 of the PED 30 inoperative unless it is returned to a factory and reset by a qualified technician. In the present invention, the Interlock circuit 72 can be fed by electrodes 58 formed from ITO. Again, if the brittle and delicate ITO electrodes 58 are damaged or altered, the Interlock circuit 72 is activated, and the processing unit 74 of the PED 30 is shutdown until returned to a factory for servicing.

In another alternative embodiment of the present invention, it is observed that the layout of electrodes has typically been such that the electrodes are separated by only a thin substrate material. However, the electrodes can be arranged in other ways in order to achieve increased sensitivity in other dimensions.

In FIG. 8, a PED 30 has a cover template 56 over the keys 38. From touchpad detection circuitry 84, an X electrode 80 might be disposed on an inside cover or the interior of the PED 30, while the SENSE electrode 82 is placed on an exterior surface of the PED 30. Thus, the housing 32 or the cover template 56 of the PED 30 is now serving as the substrate material for the electrodes 80, 82. But consider also that there is now a substantial separation between the X and SENSE electrodes 80, 82. This separation expands the electric field between the X and SENSE electrodes 80, 82, and thereby expands the distance and dimensions in which the present invention can detect the intruding sensor.

The touchpad detection circuitry 84 is the same circuitry coupled to the XY electrode grid of a typical touchpad 10, but simply modified by being coupled to electrodes 80, 82 that are not arranged in the traditional touchpad array of planar electrodes.

The present invention is not limited to the specific examples herein of where the electrodes of a capacitance sensitive touchpad can be disposed in order to detect intrusion into a PED 30. The electrodes can be disposed inside the housing, on the exterior of the housing, or both inside and outside the housing. Accordingly, detection is not limited to an input area, but to any portion of the PED 30, including but not limited to a card swipe mechanism, etc.

The embodiments above are part of the first type of intrusion detection system that is in an "always on" mode of operation, and able to detect intrusion at any time as long as the circuitry has power. The second type of intrusion detection system of the present invention is related, but only operates in a more limited time frame.

Figure 9:
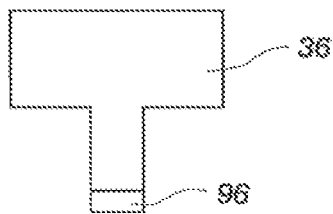
FIG. 9 is an individual key having a metal disk disposed on a contact end for use in the present invention.

The second type of intrusion detection system uses key "profiles", wherein the key profiles are only examined when a key is actuated. As shown in FIG. 9, a key 38 includes a conductive or dielectric material such as a metal disk 96 on a bottom end thereof. The key 38 is pressed downward so that the metal disk makes contact with a key detection system such as a detection circuit. In the present invention, the key detection circuit is the touchpad itself. Each key 38 makes contact with the surface of the touchpad 10 in a different location. Thus, when looking at the response of the touchpad 10, each key 38 has a unique signature because of its unique location on the touchpad and other factors such as the size of the metal disk 96, etc.

Each individual key 38 can be "profiled" at the factory by simply pressing on each key and looking at the response of the touchpad 10. Profiling is the step of recording how a signal appears to the touchpad when a particular key is pressed. Each key will have a unique "profile" on the touchpad. The profile for each key is then stored in the system. Insertion of an intruding sensor in a keypad 36 so that it can detect the actuation of keys 38 may become detectable by how that intruding sensor changes the profile of that key when it makes contact with the touchpad.

It is important to reiterate that in the present invention, there are two distinct intrusion detection systems that can be in operation at the same time. The general intrusion detection system is separate from the key tampering detection system, and operates as described previously. The key tampering detection system operates by comparing the profile of a key that is being pressed with all of the previously recorded key profiles.

An important aspect of the invention is to be able to change and customize the sensitivity of the general intrusion detection system and the key tampering detection system. In other words, the gain of the detection systems can be changed to provide more consistent performance in order to reduce false positives. False positives are a concern if they are being generated at a rate above some threshold value.

The threshold value for false positives will vary according to the particular use of a device. For example, a busy merchant is unlikely to want many false positives that would otherwise disrupt the flow of commerce at busy registers. Therefore, the threshold value might be raised (and the sensitivity of the system is reduced) for this particular application. The correct threshold value may only be determined after experimentation, and is therefore something that can be made adjustable so the merchant can make changes in a relatively simple manner.

By altering the gain or sensitivity of the touchpad, the false positives can be reduced without compromising the security of the PED. Accordingly, the intrusion detection system and the key tampering detection system each have their own customizable gain setting that can be altered by a technician and in some circumstances by a merchant. Thus, the detection systems can be set at different gain settings.

Another aspect of this invention that can take advantage of a modifiable gain setting is in the timing at which either system checks for tampering. For example, the gain might be kept low for a period of time. Then at predetermined intervals, the PED might run through a quick and higher gain intrusion detection procedure session to determine if any tampering has occurred that might not be detectable at a lower gain setting. The advantage is that less false positives will be generated during peak hours of operation. The system might also be modified to avoid any high gain intrusion detection procedure sessions depending upon the rate of use.

Even though the same touchpad is being used for the intrusion detection system and the key tampering detection system, the system is capable of performing all of the measurements simultaneously. At present, the system makes 48 individual measurements and comparisons 25 times every second. The number and frequency of measurements being made should not be considered a limiting feature of the present invention, and may be altered as desired.

Another aspect of the invention that should be mentioned pertains to the keys of a keypad. The keys include a key "On" threshold and a key "Off" threshold to be able to determine when a key has actually been pressed and not just accidentally tapped. It is desirable to makes these thresholds as accurate as possible. The more repeatable the detection of a keypress becomes, the lower the thresholds can be made. Lower thresholds result in easier detection of tampering with the PED and its keys.

It is to be understood that the above-described arrangements are only illustrative of the application of the principles of the present invention. Numerous modifications and alternative arrangements may be devised by those skilled in the art without departing from the spirit and scope of the present invention. The appended claims are intended to cover such modifications and arrangements.

What is claimed is:

1. A method for performing intrusion detection through monitoring of changes in an environment of a housing for a touch and proximity sensitive device, said method comprising the steps of:
   providing a touch and proximity sensitive device disposed on or within a housing and including a sense electrode that extends beyond a touch sensitive surface and that is dedicated to detection of the environment around the device and the housing and is capable of touch and proximity detection of conductive or dielectric objects that cause an imbalance of electrical charges on at least one electrode of the device;
   creating a compensation matrix by transmitting at least one signal pattern from the at least one electrode, receiving at least one response on the sense electrode, and storing the at least one response in the compensation matrix to show an initial imbalance of electrical charges on the at least one electrode as detected by the sense electrode, the compensation matrix being stored in non-volatile memory that is not erased when the device is shut off;
   performing an intrusion detection procedure by transmitting the at least one signal pattern from the at least one electrode, receiving at least one new response on the sense electrode and comparing the at least one new response to the initial imbalance stored in the compensation matrix stored in the non-volatile memory to determine if the environment around the device or the housing has changed;
   performing an action apart from normal touch and proximity sensitive device operation of detection and tracking of objects on a surface thereof, if it is determined that the at least one new response is different from the initial imbalance stored in the compensation matrix, the action being selected from the group of actions comprised of taking no action and letting the touch and proximity sensitive device to continue operating, sending an alert signal, shutting down the device, or a combination of these actions.

2. The method as defined in claim 1 wherein the method further comprises disposing the touch and proximity sensitive device within a point-of-sale (POS) device that includes a Personal Identity Number (PIN) Entry Device (PED), the POS functioning as the housing.

3. The method as defined in claim 2 wherein the method further comprises using a capacitive sensing touch and proximity sensitive touchpad as the touch and proximity sensitive device.

4. The method as defined in claim 3 wherein the method further comprises calibrating the touchpad by creating the compensation matrix when the touchpad is inserted into the PED during manufacturing.

5. The method as defined in claim 3 wherein the method further comprises performing the intrusion detection procedure each time that power is applied to the PED.

6. The method as defined in claim 3 wherein the method further comprises operating a second intrusion detection system at the same time as a first intrusion detection system.

7. The method as defined in claim 6 wherein the method further comprises:
   disposing a keypad having a plurality of keys over the touchpad;
   profiling each key of the plurality of keys by pressing each key and then measuring a response of the touchpad; and
   storing a key profile for each of the plurality of keys.

8. The method as defined in claim 7 wherein the method further comprises modifying sensitivity of the second intrusion detection procedure to thereby improve performance of the intrusion detection system.

9. The method as defined in claim 2 wherein the method further comprises:
   using an X electrode as the least one electrode that is coupled to the touch and proximity sensitive device; and
   disposing the X and the sense electrodes at locations around the PED wherein tampering may occur.

10. The method as defined in claim 9 wherein the method further comprises disposing the X and SENSE electrodes around keys of a keypad.

11. The method as defined in claim 9 wherein the method further comprises:
   constructing the X and the sense electrodes from Indium-Tin Oxide (ITO) so that the X and the sense electrodes are easily damaged; and
   covering the X and the sense electrodes using a cover template and adhesive such that an intruding sensor must be inserted into the PED by at least partially lifting the cover template and thereby damaging the X or the sense electrodes.

12. The method as defined in claim 9 wherein the method further comprises:
   disposing the X and the sense electrodes on a substrate having at least one perforation therethrough; and
   covering the X and the sense electrodes using a cover template and adhesive such that an intruding sensor must be inserted into the PED by at least partially lifting the cover template and thereby tearing the perforated substrate and causing detectable damage.

13. The method as defined in claim 9 wherein the method further comprises the steps of:
   providing an Interlock circuit in the PED;
   detecting tampering;
   sending a signal to the Interlock circuit that the PED should be shut down; and
   removing power from the PED using the Interlock circuit.

14. The method as defined in claim 9 wherein the method further comprises:
   disposing one of the X and the sense electrodes inside the PED; and
   disposing the other electrode of the X and the sense electrodes on an outside surface of the PED.

15. The method as defined in claim 2 wherein the method further comprises modifying sensitivity of the intrusion detection procedure to thereby improve performance of the intrusion detection system.

16. A method for performing intrusion detection through monitoring of changes in an environment around a keypad through changes detectable by a proximity sensor, said method comprising:
   providing a touch and proximity sensitive touchpad disposed under a keypad, wherein the touchpad includes a sense electrode that that extends beyond a touch sensitive surface and that is dedicated to detection of the environment around the keypad and is capable of touch and proximity detection of conductive or dielectric objects that cause an imbalance of electrical charges on at least one electrode of the touchpad;
   providing a plurality of keys in the keypad that is disposed over the touchpad;
   profiling each key of the plurality of keys by creating a compensation matrix by pressing each key and then measuring a response on the sense electrode, and storing the response for each key in the compensation matrix, the compensation matrix being stored in non-volatile memory that is not erased when the device is shut off;
   performing an intrusion detection procedure by pressing a key, measuring a new response by the sense electrode for that key, and comparing the new response to the stored response for that key in the compensation matrix stored in the non-volatile memory to determine if the environment around the keypad has changed; and
   performing an action if it is determined that the new response is different from the stored response in the compensation matrix, the action being selected from the group of actions comprised of taking no action and letting the keypad continue operating, sending an alert signal, shutting down the keypad, or a combination of these actions.

17. The method as defined in claim 16 wherein the method further comprises disposing the touchpad and the keypad within a point-of-sale (POS) device that includes a Personal Identity Number (PIN) Entry Device (PED).

18. The method as defined in claim 17 wherein the method further comprises creating the compensation matrix when the touchpad and the keypad are inserted into the PED during manufacturing.

19. The method as defined in claim 17 wherein the method further comprises performing the intrusion detection procedure each time one of the plurality of keys is actuated.

20. The method as defined in claim 17 wherein the method further comprises modifying sensitivity of the touchpad to thereby improve performance of the intrusion detection system.

21. The method as defined in claim 17 wherein the method further comprises operating a second intrusion detection system at the same time as a first intrusion detection system.

* * * * *